(12) United States Patent
Woolfenden

(10) Patent No.: US 7,055,555 B2
(45) Date of Patent: Jun. 6, 2006

(54) CABLE LAYOUT TOOL

(76) Inventor: Ken D. Woolfenden, 20789 Eskridge Ct., Potomac Falls, VA (US) 20165

( * ) Notice: Subject to any disclaimer, the term of this patent is extended or adjusted under 35 U.S.C. 154(b) by 115 days.

(21) Appl. No.: 10/777,243

(22) Filed: Feb. 13, 2004

(65) Prior Publication Data

US 2004/0163915 A1    Aug. 26, 2004

Related U.S. Application Data

(60) Provisional application No. 60/448,139, filed on Feb. 20, 2003.

(51) Int. Cl.
*H01R 43/33* (2006.01)

(52) U.S. Cl. ............... 140/123; 140/147; 29/755; 59/78.1

(58) Field of Classification Search .............. 29/755; 59/78.1; 140/123, 92.1, 147; 191/12 R
See application file for complete search history.

(56) References Cited

U.S. PATENT DOCUMENTS

| | | | | |
|---|---|---|---|---|
| 4,030,527 A | * | 6/1977 | Roch | 140/92.1 |
| 4,337,934 A | * | 7/1982 | Caveney | 269/77 |
| D311,487 S | | 10/1990 | Platt | D8/396 |
| 6,318,063 B1 | * | 11/2001 | Komiya et al. | 59/78.1 |
| 6,349,807 B1 | | 2/2002 | Northup et al. | 191/12 R |
| 6,463,728 B1 | | 10/2002 | Daoud | 59/78.1 |
| 6,612,104 B1 | * | 9/2003 | Blase | 59/78.1 |

FOREIGN PATENT DOCUMENTS

FR    2676245    11/1992

* cited by examiner

*Primary Examiner*—Derris H. Banks
*Assistant Examiner*—Hung C. Le
(74) *Attorney, Agent, or Firm*—Richard C. Litman

(57) ABSTRACT

A cable layout tool with a rectangular body, including a bottom panel, two opposing sides, two open sides, and a channel located between the two opposing sides. There is also a lid attached to the top of one of the opposing sides of the rectangular body with a hinge, a latch attached to the top of the second of the opposing sides of the rectangular body and to the lid opposite from the hinge, whereby the lid bridges the channel and attaches to both opposing sides and a cord attached to the lid. The cable layout tool has a cord embodiment that allows a user to pull the cable layout tool through unbundled cable and can accommodate a variety of unbundled cable shapes and formations.

8 Claims, 5 Drawing Sheets

CABLE LAYOUT TOOL

CROSS-REFERENCE TO RELATED APPLICATION

This application claims the benefit of U.S. Provisional Patent Application Ser. No. 60/448,139, filed Feb. 20, 2003.

BACKGROUND OF THE INVENTION

1. Field of the Invention

The present invention relates to wire and cable organizing tools and, more specifically, to a device for arranging multiple cables in straight and orderly arrays.

2. Description of Related Art

There are a number of devices that are used to guide and organize various types of cable and conduit in a variety of situations and settings. These devices primarily are designed to prevent cable, conduit or other elongated elements from getting entangled, bent or damaged. These devices are reflected in the related art.

U.S. Pat. No. Des. 311,487 issued to Platt on Oct. 23, 1990, outlines the ornamental design for a wire separator structure.

U.S. Pat. No. 6,349,807 issued to Northrup et al. on Feb. 26, 2002, outlines an apparatus for inhibiting the tangling of a plurality of cables. The cable support apparatus includes a support brace having a plurality of legs, together at least partially surrounding a cable run for a plurality of cables. A side of legs opposite the cable run is formed with a plurality of spaced apart passages for separating and guiding the plurality of cables with respect to the cable run.

U.S. Pat. No. 6,463,728 issued to Daoud on Oct. 15, 2002, outlines a cable guide and trough device for preventing the overbending of cables, fibers and wires with a plurality of links each having a base and a pair of opposing sidewalls defining a passageway for guiding the cables. The links are connected at pivots located at the ends of the links to permit rotation of the links about an axis perpendicular to the base.

French Pat. No. FR 2,676,245 granted to Remy et al. published on Nov. 13, 1992, outlines the use of a device for guiding an elongated element, such as a wire, a cable, a tube, a piece of concrete rebar and in particular, pre-stressing cable, along a bench for manufacture of pre-stressed concrete elements. The device has a fixed support on which the elongated element is made to move and a guide member, which is movable and is designed to guide the elongated element, which includes an open face opposite the support.

Although each of these patents outline useful and novel cable guiding and organizing devices, what is really needed is a device and method for properly arranging post-tensioning cables that are used in reinforced concrete construction. Such a device would significantly reduce time and manual labor and would be invaluable for those involved with reinforced concrete construction.

Nothing in the related art, considered separately or together, is seen to describe the instant invention as claimed.

SUMMARY OF THE INVENTION

The device is a cable layout tool for neatly arranging, straightening, and organizing multiple cables or tendons. The device includes a rectangular, box-shaped body with two opposing sides missing. The two remaining sides form a chute with the body's bottom. A lid is attached across the top of the box to the two remaining sides, and the lid may be opened to insert a plurality of cables within the device. The interior opening of the body is adjustable to accommodate the loading of various sizes, amounts, and arrangements of cables. A handle or draw-cord is fixed to the lid to permit the loaded device to be drawn along a cable array. Wheels may be attached to the bottom of the device so that it may be easily pulled close to the ground, without requiring the operator to bend over to drag it.

Accordingly, it is a principal object of the invention to disclose a device for properly arraying multiple cables or tendons for use in construction projects in a rapid manner.

It is another object of the invention to disclose a cable layout device that is adjustable to accept a wide range of numbers and sizes cables.

It is a further object of the invention to disclose a cable layout device that is easily drawn along a plurality of cables.

Still another object of the invention is to teach a cable layout device that may be wheeled along a plurality of cables.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
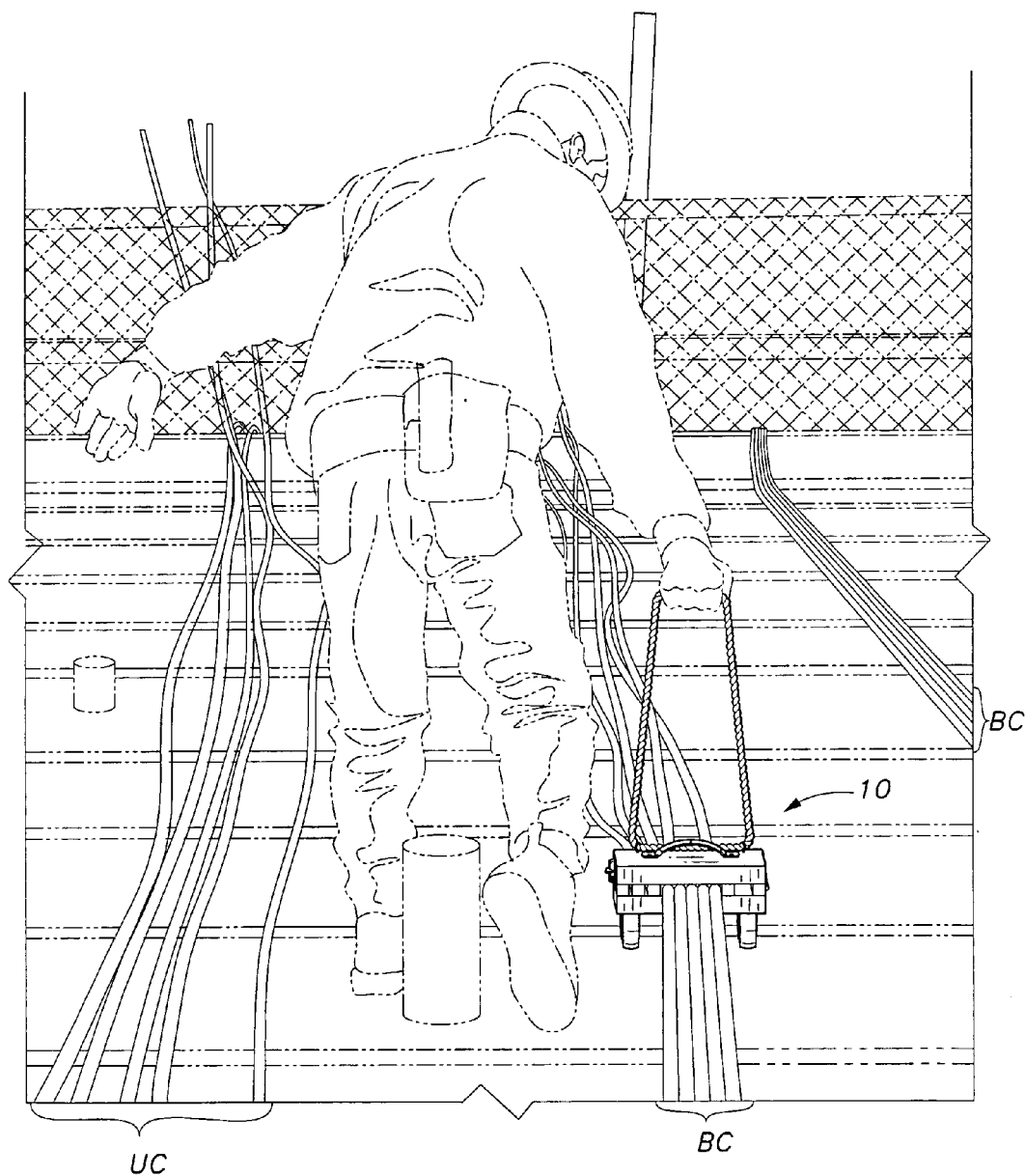
FIG. 1 is an environmental, perspective view of a cable layout tool according to the present invention.

The invention is a cable layout tool 10 as is shown in FIG. 1. More specifically, FIG. 1 shows the cable layout tool 10 being used at a building construction site. Unbundled cables UC and bundled cables BC are shown upon a concrete form in preparation for pouring the concrete. First, unbundled cables UC are placed into their approximate positions. The unbundled cables UC are in an arrangement that is not acceptable for concrete pouring. The unbundled cables UC must be bundled neatly together to avoid compromising the structure and the cables. The unbundled cables UC are placed inside the cable layout tool 10. The cable layout tool 10 is then drawn along the unbundled cables UC to create proper, bundled cables BC.

The cable layout tool 10 comprises a rectangular body 12, including a bottom panel, two opposing sides, two open sides, and a channel 14 located between the two opposing sides, a lid 16 attached to the top of one of the opposing sides of the rectangular body 12 with a hinge 24, a latch 17 attached to the top of the second of the opposing sides of the rectangular body 12 and to the lid 16 opposite from the hinge 24, whereby the lid 16 bridges the channel 14 and attaches to both opposing sides and a cord 18 attached to the lid 16.

Figure 2:
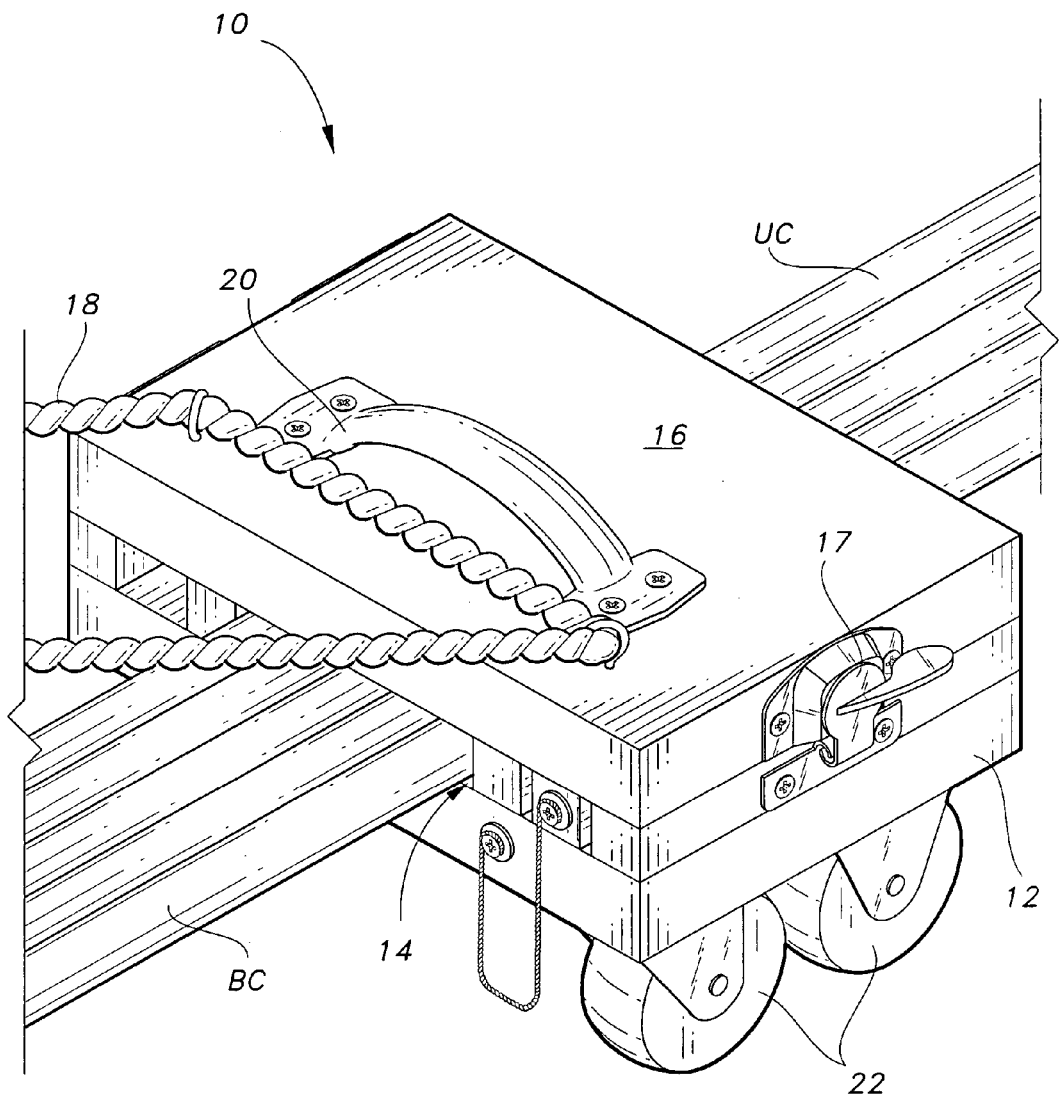
FIG. 2 is a perspective view of a cable layout tool with cable closed inside in accordance with one embodiment.

FIG. 2 shows a cable layout tool 10 loaded with unbundled cable UC that is ready to be drawn along the unbundled cable UC. The rectangular body 12 is box-shaped, but with the front and rear sides missing to form a channel 14. A lid 16 is secured across the open top of the rectangular body 12 to contain unbundled cables UC within the channel 14. The lid 16 is secured with a latch 17 on one side. The other side may be secured with a hinge 24 (FIG. 3) or with another latch 17. In one embodiment, the cable layout tool 10 has a cord 18 attached. The cord 18 enables the user to draw the cable layout tool 10 along the unbundled cables UC. In another embodiment, the cable layout tool 10 includes a handle 20 mounted to the lid 16. The handle 20 permits the user to pull the cable layout tool 10 along the unbundled cables UC without the cord 18. In another embodiment, the cable layout tool 10 includes a plurality of wheels 22 mounted to the bottom of the rectangular body 12. The wheels 22 permit the cable layout tool 10 to roll over obstacles or irregularities on the work surface without snagging.

Figure 3:
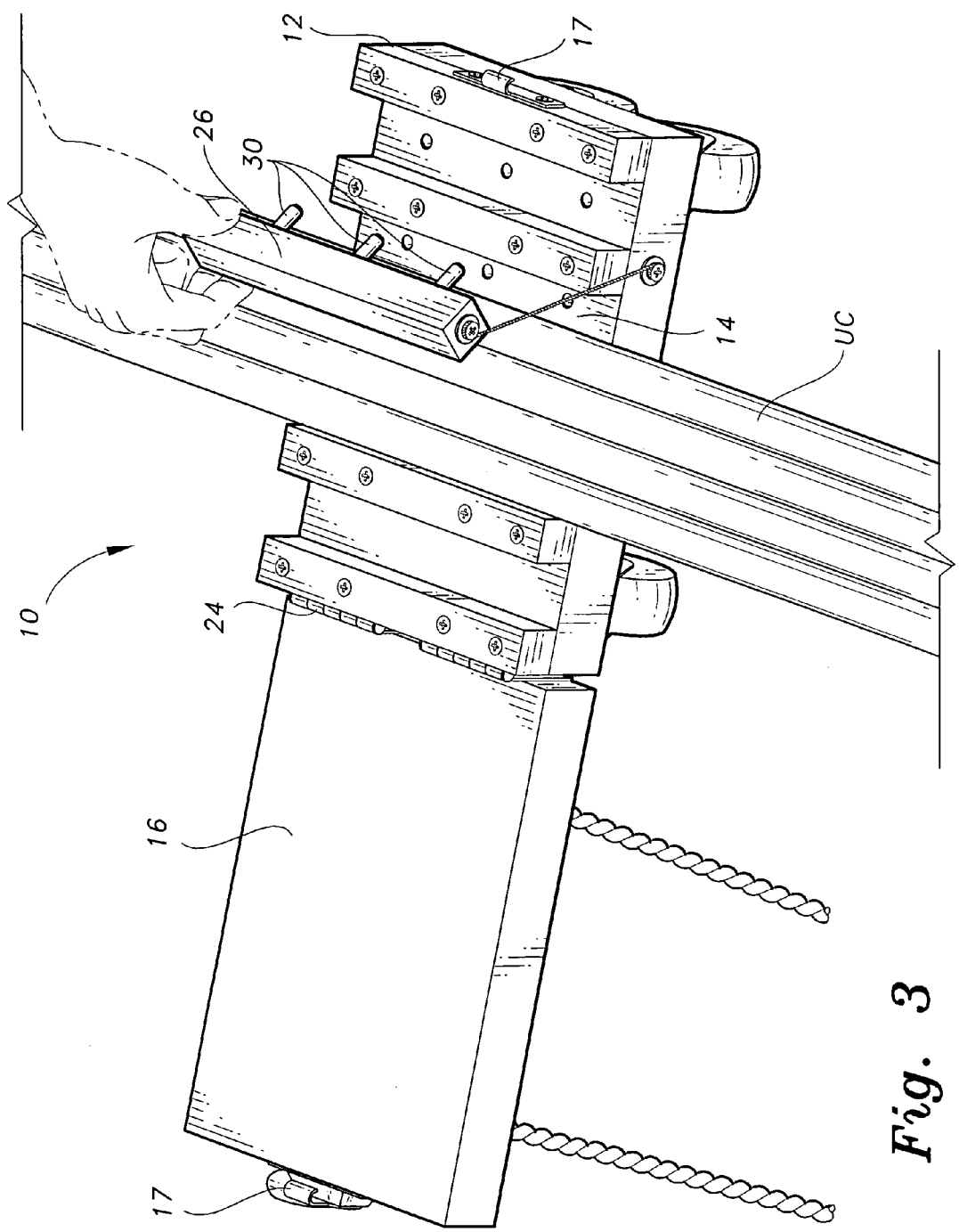
FIG. 3 is a perpsective view of a cable layout tool with a spacer bar removed, in accordance with one embodiment.

FIG. 3 shows unbundled cables UC being placed inside a cable layout tool 10. In this embodiment, the lid 16 is attached to the rectangular body 12 with a hinge 24. The interior dimensions of the channel 14 are adjustable to meet the current needs of the job. The unbundled cable UC may need to be arranged in a variety of configurations, including flat, stacked, and pyramid shapes. The cable layout tool 10 is adjusted for different numbers and configurations of unbundled cable UC by moving or removing an adjustment bar 26. The cable layout tool 10 has one or more adjustment bars 26. In one embodiment, the adjustment bar 26 has pegs 30 to engage the channel 14 and hold it in place. The lid 16 covers the top of the adjustment bar 26 and prevents the adjustment bar 26 from moving.

Figure 4:
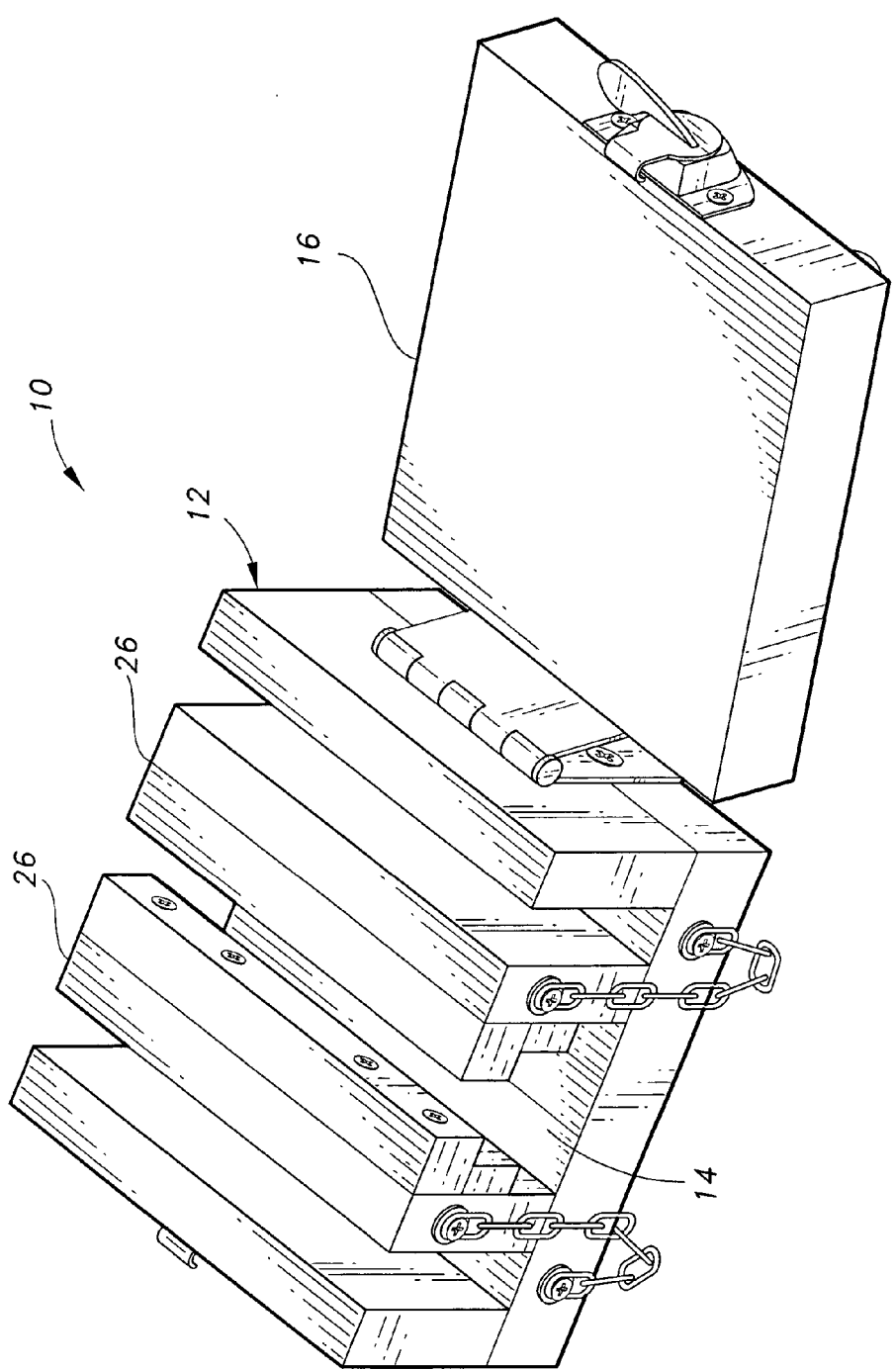
FIG. 4 is a perspective view of a cable layout tool with lid opened in accordance with one embodiment.

FIG. 4 shows a cable layout tool 10 with a plurality of adjustment bars 26. In this embodiment the adjustment bars 26 provide a stacked or pyramid shape to the unbundled cables UC. Each adjustment bar 26 is individually adjustable to permit the space within the channel 14 between the adjustment bars 26 to accommodate any number of unbundled cables UC up to the maximum width of the channel 14.

Figure 5:
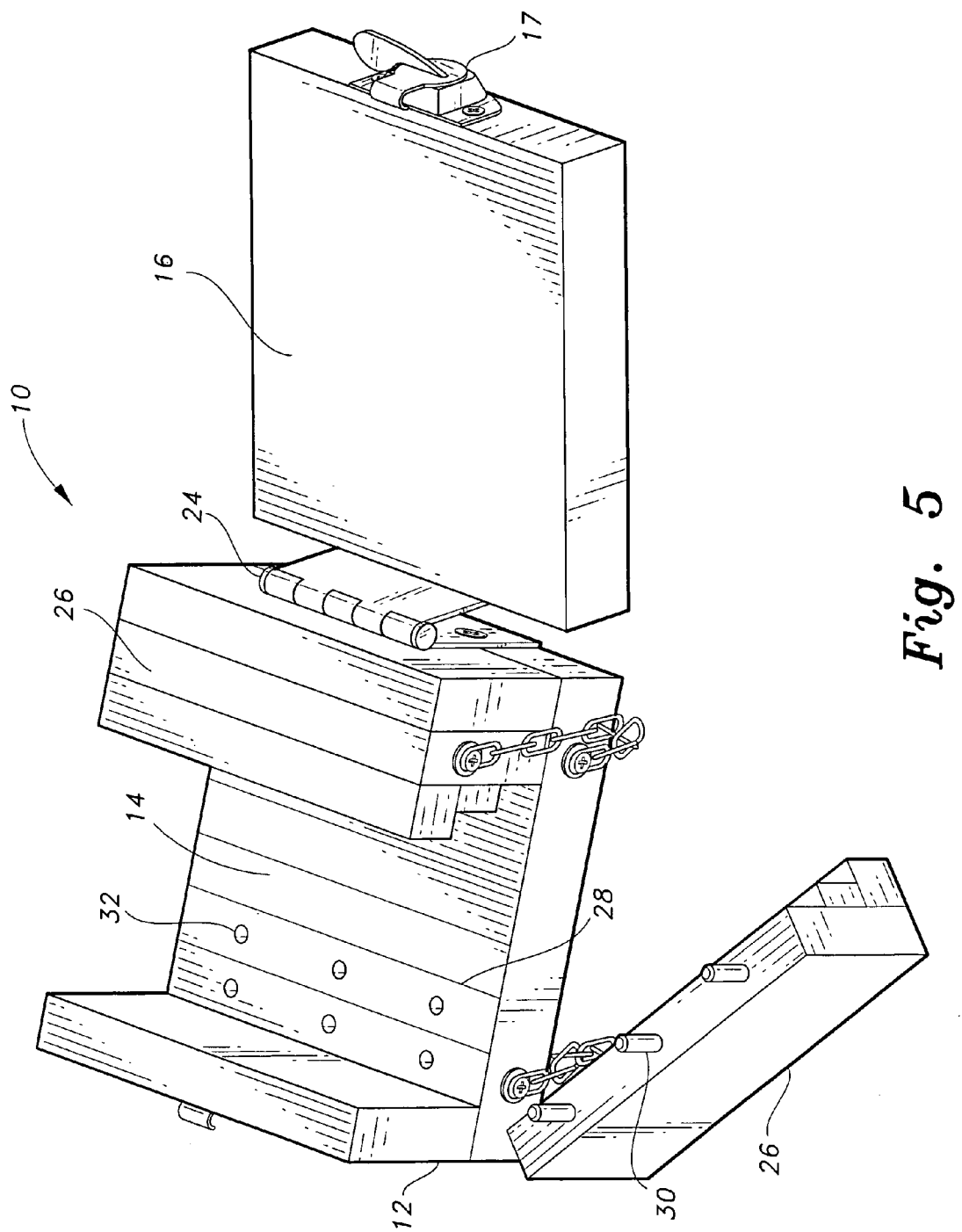
FIG. 5 is an elevational perspective view of a cable layout tool with lid opened in accordance with one embodiment.

FIG. 5 shows a cable layout tool 10 with the lid 16 open and with one of the plurality of adjustment bars 26 removed. In one embodiment, the channel 14 is inscribed with layout lines 28 marked with the dimensions of standard unbound wires, cables or conduit. The layout lines 28 permit the user to quickly place the adjustment bars 26 to accommodate the desired number of unbound cables or tendons in an arrangement. Each adjustment bar 26 is prevented from moving within the channel 14 by a plurality of pegs 30 in conjunction with the lid 16. A plurality of holes 32 are located in the channel 14, corresponding to the pegs 30.

Use of the cable layout tool 10 is straightforward. The cable layout tool 10 is used primarily to arrange unbundled cables UC properly for incorporation into a structure, particularly reinforced concrete structures. The cable layout tool 10 includes a rectangular body 12 with two opposing sides missing. The remaining two sides form a chute or channel 14. A lid 16 is attached across the top of the body 12 to the two remaining sides, and the lid 16 may be opened to insert multiple unbundled cables UC within the cable layout tool 10.

The interior opening of the rectangular body 12 is adjustable to accommodate various sizes, amounts, and arrangements of unbundled cables UC. A handle 20 or draw-cord attachment is fixed to the lid 16 to permit the loaded cable layout tool 10 to be drawn along a set of unbundled cable UC. A plurality of wheels 22 may be attached to the bottom of the cable layout tool 10 so that it may be easily pulled close to the ground.

It is to be understood that the present invention is not limited to the sole embodiments described above, but encompasses any and all embodiments within the scope of the following claims.

I claim:

1. A cable layout tool, comprising:
   a rectangular body, including a bottom panel, two opposing sides, two open sides, and a channel located between the two opposing sides;
   a lid attached to the top of one of the opposing sides of the rectangular body with a hinge;
   a handle, attached to the lid for grasping; and
   a latch attached to the top of the second of the opposing sides of the rectangular body and to the lid opposite from the hinge, whereby the lid bridges the channel and attaches to both opposing sides.

2. The cable layout tool according to claim 1, further comprising a plurality of wheels attached to the bottom of the rectangular body.

3. The cable layout tool according to claim 1, further comprising a hinge attaching the lid to the rectangular body.

4. The cable layout tool according to claim 1, further comprising an adjustment bar, moved to adjust for predetermined different numbers and configurations of unbundled cable.

5. The cable layout tool according to claim 4, further comprising a plurality of pegs, for connecting the adjustment bar to the channel.

6. The cable layout tool according to claim 1, wherein the adjustment bars are arranged and configured to provide a stacked or pyramid shape to the unbundled cables.

7. A cable layout tool, comprising:
   a rectangular body, including a bottom panel, two opposing sides, two open sides, and a channel located between the two opposing sides;
   a lid attached to the top of one of the opposing sides of the rectangular body with a hinge;
   a latch attached to the top of the second of the opposing sides of the rectangular body and to the lid opposite from the hinge, whereby the lid bridges the channel and attaches to both opposing sides; and
   a cord attached to the cable layout tool for grasping.

8. A cable layout tool, comprising:
   a rectangular body, including a bottom panel, two opposing sides, two open sides, and a channel located between the two opposing sides, wherein the channel is inscribed with layout lines marked with the dimensions of unbundled cables;
   a lid attached to the top of one of the opposing sides of the rectangular body with a hinge; and
   a latch attached to the top of the second of the opposing sides of the rectangular body and to the lid opposite from the hinge, whereby the lid bridges the channel and attaches to both opposing sides.

* * * * *